United States Patent [19]

Birnbach et al.

[11] Patent Number: 4,922,029

[45] Date of Patent: May 1, 1990

[54] ETHERIFICATION OF POLYOXYALKYLENE DERIVATIVES

[75] Inventors: Stefan Birnbach, Ludwigshafen; Josef Mueller, Grosskarlbach; Klaus Wulz, Lambsheim; Jochen Houben, Ludwigshafen, all of Fed. Rep. of Germany

[73] Assignee: BASF Aktiengesellschaft, Ludwigshafen, Fed. Rep. of Germany

[21] Appl. No.: 228,488

[22] Filed: Aug. 5, 1988

[30] Foreign Application Priority Data

Aug. 6, 1987 [DE] Fed. Rep. of Germany ....... 3726121

[51] Int. Cl.$^5$ .............................................. C07C 41/01
[52] U.S. Cl. ..................... 568/616; 568/613; 568/618; 568/619
[58] Field of Search ................ 568/618, 613, 616, 619

[56] References Cited

U.S. PATENT DOCUMENTS

| | | | |
|---|---|---|---|
| 2,520,611 | 8/1950 | Roberts et al. ...................... | 568/613 |
| 3,653,183 | 4/1972 | Sanders et al. . | |
| 3,911,024 | 10/1975 | Croix .................................... | 562/689 |
| 4,275,244 | 6/1981 | Helfert et al. . | |
| 4,587,365 | 5/1986 | Anchor . | |

FOREIGN PATENT DOCUMENTS 1566770  5/1980  United Kingdom .

OTHER PUBLICATIONS

Beger et al., Germany (East), DD244549, 4/8/87.
CA 108: 5579d, 1988.

Primary Examiner—Howard T. Mars
Attorney, Agent, or Firm—Oblon, Spivak, McClelland, Maier & Neustadt

[57] ABSTRACT

Etherified polyoxyalkylene derivatives of the formula

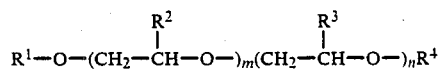

where $R^1$ is hydrogen, $C_1$-$C_{20}$-alkyl or $C_3$-$C_5$-alkenyl, $R^2$ and $R^3$ independently of one another are each hydrogen, methyl or ethyl, $R^4$ is $C_1$-$C_4$-alkyl and m and n are identical or different and are each greater than or equal to 0, with the proviso that the sum of m and n is from 3 to 300, are prepared by reacting the corresponding hydroxyl-containing polyoxyalkylene derivative with a dialkyl sulfate in the presence of an alkali metal hydroxide by a process in which the reaction is carried out at from 20° to 60° C. in the presence of an aqueous solution of an alkali metal hydroxide, the concentration of alkali metal hydroxide during the entire duration of the reaction being not less than 35% by weight, based on the aqueous phase, and not less than 1 mole of dialkyl sulfate and not less than one mole of alkali metal hydroxide are used per mole equivalent of organic hydroxyl groups.

7 Claims, No Drawings

ETHERIFICATION OF POLYOXYALKYLENE DERIVATIVES

The present invention relates to a novel process or the preparation of etherified polyoxyalkylene derivatives by reacting the corresponding free hydroxy compound with a dialkyl sulfate in the presence of an aqueous solution of an alkali metal hydroxide.

It is known that polyoxyalkylene compounds having one or more terminal hydroxyl groups can be etherified by first converting the free hydroxy compound with an alkali metal, an alcoholate, a hydride or a hydroxide of an alkali metal into the corresponding alkali metal alcoholate and then further reacting the latter with an alkylating agent, for example a dialkyl sulfate or an alkyl halide.

DE-A No. 2 800 710 furthermore discloses a process for the preparation of etherified polyoxyalkylene compounds, in which the free hydroxy compound is treated with an organic halide, for example butyl chloride, in the presence of an aqueous solution of sodium hydroxide or potassium hydroxide whose initial concentration of sodium hydroxide or potassium hydroxide is not less than 30% by weight, based on the aqueous solution, at in general from 80° to 100° C.

It has been found, however, that the etherification reaction under these reaction conditions is unsatisfactory.

It is an object of the present invention to provide a novel process which permits the etherification of polyoxyalkylene derivatives to be carried out in a simple manner and with good yields.

We have found that this object is achieved and that the preparation of polyoxyalkylene derivatives of the formula I

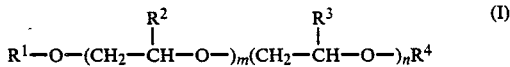

where $R^1$ is hydrogen, $C_1$-$C_{20}$-alkyl or $C_3$-$C_5$-alkenyl, $R^2$ and $R^3$ are identical or different and independently of one another are each hydrogen, methyl or ethyl, $R^4$ is $C_1$-$C_4$-alkyl and m and n are identical or different and are each greater than or equal to 0, with the proviso that the sum of m and n is from 3 to 300, by reacting a polyoxyalkylene compound of the formula II

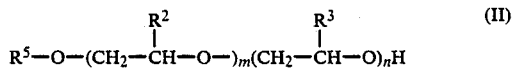

where $R^5$ is hydrogen, $C_1$-$C_{20}$-alkyl or $C_3$-$C_5$-alkenyl and $R^2$, $R^3$, m and n each have the above meanings, with a dialkyl sulfate of the formula III $$(R^4O)_2SO_2 \qquad (III)$$

where $R^4$ has the above meanings, in the presence of an alkali metal hydroxide takes place in an advantageous manner if the reaction is carried out at from 20 to 60° C. in the presence of an aqueous solution of an alkali metal hydroxide, the concentration of alkali metal hydroxide during the entire duration of the reaction being not less than 35% by weight, based on the aqueous phase, and not less than 1 mole of dialkyl sulfate of the formula III and not less than one mole of alkali metal hydroxide are used per mole equivalent of organic hydroxyl groups.

All alkyl groups occurring in the abovementioned formulae I, II and III can be either straight-chain or branched.

$R^1$, $R^4$ and $R^5$ are, for example, methyl, ethyl, propyl, isopropyl, butyl, isobutyl or sec-butyl.

$R^1$ and $R^5$ can furthermore be, for example, pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, 3,5,5,7-tetramethylnonyl, isotridecyl, tetradecyl, pentadecyl, hexadecyl, heptadecyl, octadecyl, nonadecyl, eicosyl, allyl or methallyl (the names isooctyl, isononyl, isodecyl and isotridecyl are trivial names and are derived from the alcohols obtained in the oxo synthesis; cf. Ullmann, Enzyklopadie der Technischen Chemie, 4th Edition, Volume 7, pages 215-217, and Volume 11, pages 435 and 436).

Preferably used starting materials are polyoxyalkylene derivatives of the formula II, where $R^5$ is hydrogen or $C_8$-$C_{16}$-alkyl.

Other preferred polyoxyalkylene derivatives of the formula II are those in which the sum of m and n is from 3 to 10 or from 50 to 100.

A preferred alkylating agent is a dialkyl sulfate of the formula III where $R_4$ is ethyl or, in particular, methyl.

If polyoxyalkylene derivatives of the formula II where $R^5$ is hydrogen are used as starting materials, dietherification takes place. In this case, etherified poloxyalkylene derivatives of the formula I where $R^1$ is identical to $R^4$ are obtained.

Examples of suitable alkali metal hydroxides whose aqueous solutions are required for the novel process are lithium hydroxide, sodium hydroxide and potassium hydroxide. The use of potassium hydroxide solution and in particular sodium hydroxide solution is preferred.

Not less than 1 mole, preferably from 1.2 to 2.5 moles, of dialkyl sulfate III and not less than 1 mole, preferably from 3 to 20 moles, of alkali metal hydroxide are used per mole equivalent of organic hydroxyl groups in the starting material II.

According to the invention, the concentration of alkali metal hydroxide should not be less than 35% by weight, based on the aqueous phase, during the entire duration of the reaction. For this reason, an aqueous alkali metal hydroxide solution whose concentration of alkali metal hydroxide is about 50% by weight is advantageously chosen as the reagent.

It should also be noted that the aqueous alkali metal hydroxide solution is metered in at a rate such that the alkali metal hydroxide concentration does not fall below the stated lower limit.

For this purpose, the novel process is advantageously carried out as follows: the polyoxyalkylene derivative II to be etherified is initially taken together with from 20 to 50%, preferably from 25 to 30%, based on the total amount of aqueous alkali metal hydroxide solution required for the reaction, of the aqueous alkali metal hydroxide solution, after which about 25% of the total amount of dialkyl sulfate required is metered in at a rate such that the temperature of the reaction mixture is from 20° to 60° C., preferably from 30° to 50° C., particularly preferably from 38° to 42° C.

Thereafter, the remaining part of the aqueous alkali metal hydroxide solution, ie. from 50 to 80%, preferably from 70 to 75%, based on the total amount of aqueous alkali metal hydroxide solution required for the reaction is added to the reaction mixture together with about 50% of the total amount of dialkyl sulfate required.

The components are added simultaneously but separately from one another. During the addition, care should be taken to ensure that the abovementioned temperature of the reaction mixture is maintained.

Finally, when the addition of the stated amounts of dialkyl sulfate and aqueous alkali metal hydroxide solution are complete, the remaining amount of dialkyl sulfate (about 25%, based on the total amount required) is metered into the reaction mixture at a rate such that in this case too the abovementioned temperature is maintained.

After the end of the reaction, which generally takes from 4 to 20 hours, water is added to the resulting reaction mixture, which is heated to 80°–100° C. Thereafter, the aqueous phase is separated off and the organic phase is evaporated down under reduced pressure. Small amounts of salt which may occur in certain circumstances are filtered off.

The novel process is usually carried out in the absence of a solvent. In some cases, however, it may be advantageous to carry out the reaction in the presence of an inert organic solvent, for example toluene or petroleum ether.

In some cases, it may also be advantageous to effect the reaction under a protective gas atmosphere, for example under nitrogen.

The novel process can be carried out either batchwise or continuously.

The novel process gives a high degree of etherification in the reaction of the hydroxyl-containing polyoxyalkylene derivatives II. Furthermore, very pale polyoxyalkylene derivatives I are obtained. This is critical since the pale color is an important requirement when the polyoxyalkylene derivatives I are used, for example, as nonionic surfactants.

The Examples which follow illustrate the invention. Percentages are by weight.

EXAMPLE 1

2 kg of an adduct of 7 moles of ethylene oxide and 1 mole of butylene oxide with 1 mole of a $C_9$-$C_{11}$-oxo alcohol mixture which had an initial OH number of 98 mg of KOH/g and 0.6 kg of 50% strength sodium hydroxide solution were initially taken in a flask flushed with nitrogen. 0.19 kg of dimethyl sulfate were added dropwise at 35° C. under nitrogen. Thereafter, 1.04 kg of 50% strength sodium hydroxide solution and 0.32 kg of dimethyl sulfate were simultaneously added dropwise at 35° C. under nitrogen. 0.12 kg of dimethyl sulfate was then added dropwise at 40° C. under nitrogen. After the reaction had continued for a further 2 hours at 40° C., 3 l of water were added and the mixture was heated to 90° C. The aqueous phase was separated off, the organic phase was then evaporated down under reduced pressure and the residue was subjected to clarifying filtration. 2 kg of product having a residual OH number of 8 mg of KOH/g were isolated.

EXAMPLE 2

1.4 kg of an adduct of 6 moles of ethylene oxide and 4 moles of propylene oxide with 1 mole of a $C_{13}$-$C_{15}$-oxo alcohol mixture which had an initial OH number of 80 mg of KOH/g and 0.31 kg of 50% strength sodium hydroxide solution were initially taken in a flask flushed with nitrogen. 0.11 kg of dimethyl sulfate were added dropwise at 38° C. under nitrogen. Thereafter, 0.63 kg of 50% strength sodium hydroxide solution and 0.19 kg of dimethyl sulfate were simultaneously added dropwise at 38° C. under nitrogen. 0.07 kg of dimethyl sulfate was then added dropwise at 38° C. under nitrogen. After the reaction had continued for a further 2 hours at 40° C., 2 l of water were added and the mixture was heated to 90° C. The aqueous phase was separated off, the organic phase was then evaporated down under reduced pressure and the residue was subjected to clarifying filtration. 1.4 kg of product having a residual OH number of 8 mg of KOH/g were isolated.

EXAMPLE 3

3 kg of a polypropylene oxide (molecular weight 4,000; initial OH number of 28 mg of KOH/g) and 1.2 kg of 50% strength sodium hydroxide solution were initially taken in a flask flushed with nitrogen. 8.08 kg of dimethyl sulfate was added dropwise at 38° C. under nitrogen. Thereafter, 1.2 kg of 50% strength sodium hydroxide solution and 0.14 kg of dimethyl sulfate were simultaneously added dropwise at 38° C. under nitrogen. 0.05 kg of dimethyl sulfate was then added dropwise at 38° C. under nitrogen. After the reaction had continued for a further 2 hours at 40° C., 3.8 l of water were added and the mixture was heated at 90° C. The aqueous phase was separated off, the organic phase was then evaporated down under reduced pressure and the residue was subjected to clarifying filtration. 3 kg of product having a residual OH number of 6 mg of KOH/g were isolated.

EXAMPLE 4 (COMPARISON)

The procedure described in Example 2 was followed, except that the reaction temperature was 90° C. A product having a residual OH number of 45.5 mg of KOH/g was isolated.

EXAMPLE 5 (COMPARISON)

0.7 kg of an adduct of 6 moles of ethylene oxide and 4 moles of propylene oxide with 1 mole of a $C_{13}/C_{15}$-oxo alcohol mixture which had an initial OH number of 80 mg of KOH/g and 0.24 kg of 50% strength sodium hydroxide solution were initially taken in a flask flushed with nitrogen. 0.21 kg of n-butyl bromide was added dropwise at 40° C. After the reaction had continued for a further 2 hours, excess butyl bromide was distilled off at 40° C. under reduced pressure. Thereafter, 0.5 l of water was added, the mixture was heated to 90° C. and the aqueous phase was separated off. The organic phase was evaporated down under reduced pressure and the residue was subjected to clarifying filtration. 0.7 kg of product having a residual OH number of 59 mg of KOH/g was isolated.

EXAMPLE 6

0.592 kg of dipropylene glycol monomethyl ether and 0.624 kg of 50% strength sodium hydroxide solution were initially taken. 0.222 kg of dimethyl sulfate was added dropwise at 30° C. under nitrogen. Thereafter, 1.248 kg of 50% strength sodium hydroxide solution and 0.370 kg of dimethyl sulfate were simultaneously added dropwise at 33° C. under nitrogen. 0.14 kg of dimethyl sulfate was then added dropwise at 37° C. After the reaction had continued for a further 90 minutes, 2.5 l of water were added dropwise and the mixture was heated to 93° C. The aqueous phase was separated off and the organic layer was then distilled. (The fraction boiling in the range 70–76° C. under 40 mbar contained the end product.) 597 g of product having a residual OH number of 0.5 mg of KOH/g were isolated.

EXAMPLE 7

1.438 kg of an adduct of 15 moles of ethylene oxide and 13 moles of propylene oxide with 1 mole of allyl alcohol, which had an initial OH number of 39 mg of KOH/g, and 0.16 kg of 50% strength sodium hydroxide solution were initially taken in a flask flushed with nitrogen. 0.063 kg of dimethyl sulfate was added dropwise at 27° C. under nitrogen. Thereafter, 0.320 kg of 50% strength sodium hydroxide solution and 0.063 kg of dimethyl sulfate were simultaneously added dropwise at 28° C. under nitrogen. 0.0756 kg of dimethyl sulfate was then added dropwise at 26° C. under nitrogen. After the reaction had continued for a further hour at 40° C., 2 l of water were added and the mixture was heated to 90° C. The aqueous phase was separated off and the organic phase was then evaporated down under reduced pressure. 1.39 kg of product having a residual OH number of 1.5 mg of KOH/g were isolated.

We claim:

1. A process for the preparation of an etherified polyoxyalkylene derivative of the formula I

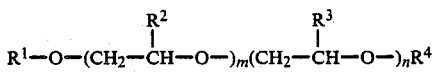
(I)

Where $R^1$ is hydrogen, $C_1$-alkyl or $C_3$-$C_5$-alkenyl, $R^2$ and $R^3$ are identical or different and independently of one another are each hydrogen, methyl or ethyl, $R^4$ is $C_2$-$C_4$-alkyl and m and n are identical or different and are each greater than or equal to 0, with the proviso that the sum of m and n is from 3 to 300, by reacting a polyoxyalkylene compound of the formula II

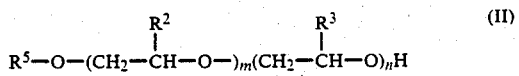
(II)

where $R^5$ is hydrogen, $C_1$-$C_{20}$-alkyl or $C_3$-$C_5$-alkenyl and $R^2$, and $R^3$, m and n each have the above meanings, with a dialkyl sulfate of the formula III

(III)

where $R^4$ has the above meanings, in the presence of an alkali metal hydroxide, wherein the reaction is carried out at from 20° to 60° C. in the presence of an aqueous solution of an alkali metal hydroxide, the concentration of alkali metal hydroxide during the entire duration of the reaction being not less than 35% by weight, based on the aqueous phase, and not less than 1 mole of dialkyl sulfate of the formula III and not less than one mole of alkali metal hydroxide are used per mole equivalent of organic hydroxyl groups.

2. The process as claimed in claim 1, wherein $R^5$ is hydrogen or $C_8$-$C_{16}$-alkyl.

3. The process as claimed in claim 1, wherein group $R^4$ said dialkyl sulfate reactant is methyl or ethyl.

4. The process as claimed in claim 1, wherein the sum of m and n in formula I ranges from 50 to 100.

5. The process as claimed in claim 1, wherein said alkali metal hydroxide in said aqueous solution is lithium hydroxide, sodium hydroxide or potassium hydroxide.

6. The process as claimed in claim 1, wherein said substituents $R^1$ and $R^5$ are pentyl, isopentyl, octyl, 2-ethylhexyl, isoctyl, nonyl, isononyl, decyl, isodecyl, undecyl, dodecyl, tridecyl, 3,5,5,7-tetramethylnonyl, isotridecyl, tetradecyl, pentadecyl, hexedecyl, heptadecyl, octadecyl, nonadecyl, eicosyl, allyl or methallyl.

7. The process as claimed in claim 1, wherein the temperature at which said reaction is conducted ranges from 30° to 50° C.

* * * * *